(12) United States Patent
Ayzenberg et al.

(10) Patent No.: US 11,474,733 B2
(45) Date of Patent: Oct. 18, 2022

(54) PUBLIC CLOUD PROVIDER COST OPTIMIZATION FOR WRITING DATA BLOCKS DIRECTLY TO OBJECT STORAGE

(71) Applicant: EMC IP Holding Company LLC, Hopkinton, MA (US)

(72) Inventors: Lev Ayzenberg, Petakh-Tikva (IL); Mark Malamut, Aliso Viejo, CA (US); Maxim Drobachevsky, Beer Sheva (IL); Sharon Vitek, Tel-Aviv (IL); Jehuda Shemer, Kfar Saba (IL); Adam Brenner, Mission Viejo, CA (US); Arun Murti, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/193,638

(22) Filed: Mar. 5, 2021

(65) Prior Publication Data
US 2022/0283707 A1    Sep. 8, 2022

Related U.S. Application Data

(63) Continuation-in-part of application No. 17/193,294, filed on Mar. 5, 2021.

(51) Int. Cl.
*G06F 3/06* (2006.01)
*G06F 9/54* (2006.01)

(52) U.S. Cl.
CPC ............. *G06F 3/065* (2013.01); *G06F 3/067* (2013.01); *G06F 3/0619* (2013.01); *G06F 9/541* (2013.01)

(58) Field of Classification Search
CPC ........ G06F 9/541; G06F 3/067; G06F 3/0619; G06F 3/065
See application file for complete search history.

(56) References Cited

U.S. PATENT DOCUMENTS

| 10,380,074 | B1* | 8/2019 | Gu | G06F 16/1752 |
|---|---|---|---|---|
| 2013/0019027 | A1* | 1/2013 | Kazan | G06F 16/27 709/240 |
| 2015/0134717 | A1* | 5/2015 | Naganuma | H04L 67/1095 709/201 |
| 2015/0373385 | A1* | 12/2015 | Straub | H04N 21/2668 725/34 |

(Continued)

*Primary Examiner* — Nanci N Wong
(74) *Attorney, Agent, or Firm* — Staniford Tomita LLP

(57) ABSTRACT

Embodiments for optimizing a cost of storing backup data in an object store of a public cloud network provided by a cloud provider by storing delta objects each embodying changes to blocks of the backup data between a full backup incremental backups. The delta objects are each of a same block size, which can be changed. The process selects two sequential delta objects to form a larger object by extending each block to a minimal part size that is larger than the block size and inserting a region of unchanged data between the two delta objects. The larger object is divided into three different parts comprising the inserted region, and each of the extended delta object blocks. The process calculates an API and a compute cost for a synthesis operation on the delta objects based on a cost model and current price schedule of the cloud provider for the three different parts, and for the substantially larger object as a whole. The process selects a block size for the delta objects based on a lowest calculated cost.

18 Claims, 13 Drawing Sheets

(56) References Cited

U.S. PATENT DOCUMENTS

| | | | |
|---|---|---|---|
| 2020/0174893 A1* | 6/2020 | Tormasov | G06F 16/183 |
| 2020/0341864 A1* | 10/2020 | Agrawal | G06F 11/1461 |
| 2020/0351347 A1* | 11/2020 | Chang | G06F 9/5083 |

* cited by examiner

Block Hash Catalog    1110

| Block # | tEnd | Hash |
|---------|------|------|
| 2 | <t9> | <H29...> |
| 2 | <t6> | <H26...> |
| 0 | <t4> | <H04...> |
| 3 | <t5> | <H35...> |
| 3 | <t4> | <H34...> |

# PUBLIC CLOUD PROVIDER COST OPTIMIZATION FOR WRITING DATA BLOCKS DIRECTLY TO OBJECT STORAGE

CROSS-REFERENCE TO RELATED APPLICATIONS

The present application is a Continuation-In-Part application and claims priority to U.S. patent application Ser. No. 17/193,294 filed on Mar. 5, 2021, entitled "Writing Data Blocks Directly to Object Storage," and assigned to the assignee of the present application.

TECHNICAL FIELD

This invention relates generally to object storage services, and more specifically to systems and methods for optimizing reverse delta costs when writing data blocks directly to object storage for public cloud provider cost models.

BACKGROUND OF THE INVENTION

Users of large-scale backup and data protection systems usually have data that is stored on a variety of primary storage devices in varying formats that all need to be protected. These data sources can span physical machines, virtual machines (VMs), databases, filesystems or block storage to name a few. Data protection and disaster recovery processes represent the last line of defense for users and protecting this data efficiently with a very high level of reliability and the ability for fast data recovery is critical for maintaining business continuity.

Such systems often use storage area networks (SANs) having disk arrays that store files using block storage techniques. With block storage, files are split into evenly sized blocks of data each having a unique address. Block storage devices are accessible as volumes directly by the operating system and are well-suited for structured databases, random read/write loads, and virtual machine file system (VMFS) volumes. The vast increase of web-based data consisting of unstructured data sets (e.g., multimedia content, archival images, static web content, etc.) has led to an increased use of object storage in which data is stored as objects as opposed to hierarchical files (as for block storage). Each object typically includes the data, an expandable amount of metadata, and a globally unique identifier. This allows storage systems to store massive and readily scalable amounts of unstructured data.

Object storage represents a type of key-value storage that uses an associative array to link a unique key to a value in the data collection to form a key-value pair, and is used extensively in cloud-based storage systems. The Amazon Simple Storage Service ("AWS S3") is an example of a service that provides object storage through a web service interface. Amazon S3, Microsoft Azure, and other similar key-value or object storage systems, are used to store any type of data object for Internet applications, backup and recovery, disaster recovery, data archives, data lakes for analytics, and hybrid cloud storage. The basic storage units of this type of web storage are objects that are organized into buckets. Each object is identified by a unique, user-assigned key. Data can be can accessed through the S3 service from anywhere on the Internet, and requests are authorized using an access control list associated with each object bucket. Such object storage systems provide a highly available, flexible and inexpensive data protection target. However, data systems that contain disparate types of data often cannot easily and efficiently leverage the full benefits of object storage.

For data backup applications, the most common use case for data recovery in backup systems is restoring the most recent version of a file. Existing technologies generally do not employ various efficiencies or optimize for restoring of the most recent version of a data source. Most present deduplication backup systems locally find identical sequences of data between data sources and use references (fingerprints) to avoid storing duplicate data. This is computationally intensive and imposes a high cost to protect data sources. Many products that write directly to the cloud for disaster recovery purposes will store fully changed data blocks as opposed to granular level changes (which requires a much higher level of storage consumption), or will store standard incremental changes (forward deltas) that need to be applied during restore time. This significantly delays the restore time for restoring a most recent version of a file.

What is needed, therefore, is a system and method for identifying and optimizing important and time-sensitive workflows to leverage object storage and thereby implement a flexible, available and cost-effective data storage solution.

What is further needed is a system that optimizes object storage operations to cost-effectively accommodate public cloud provider cost models.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
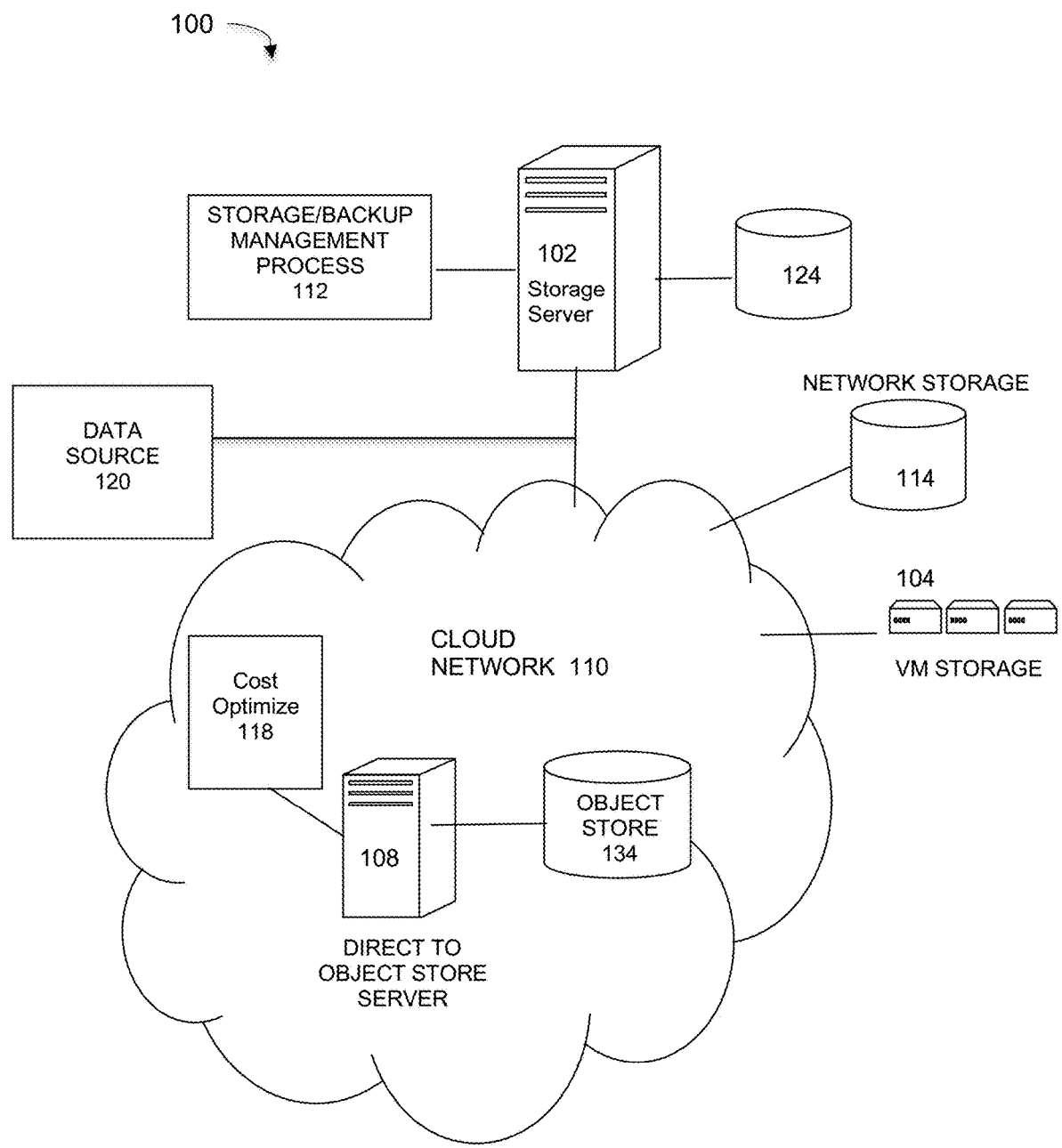
FIG. 1 is a diagram of a cloud computing network implementing a direct to object storage process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud-based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As is known, cloud computing provides a shared pool of configurable computing resources (e.g., computer networks, servers, storage, applications and services) that can be rapidly provisioned and released with minimal management effort. Large-scale cloud networks are often provided by cloud providers that maintain data centers that consolidate vast computing resources such as storage and processing power. By leveraging the public cloud, users can generally protect their data with low cost and involvement as there is no need for them to acquire, deploy or manage a complex data protection environment.

Embodiments are described for a system where data can be efficiently transferred, stored, recovered and organized from a data source directly to object storage which is optimized for key customer workflows. The method is based around a fixed block architecture whereby each data source is serialized into a set of constant size blocks. The client side and server side are decoupled so as to enable efficiency improvements in the server processing and storage model without requiring changes to the client (data source) componentry.

FIG. 1 illustrates a system for implementing a direct to object store system, under some embodiments. In system 100, a storage server 102 executes a data storage or backup management process 112 that coordinates or manages the backup of data from one or more data sources 120 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or other data source, in the network environment.

The data sourced by the data source may be any appropriate data, such as database data that is part of a database management system, and the data may reside on one or more hard drives for the database(s) in a variety of formats.

The network server computers are coupled directly or indirectly to the data storage 114, target VMs 104, and the data sources and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, cloud network 110 may be a private network or it may be a public network provided by a third-party cloud service provider. In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider.

As shown in FIG. 1, cloud network 110 may include cloud storage resources 134. In general, cloud storage is a model of data storage in which the data is stored in logical pools. The physical storage spans multiple servers, and the physical environment may be owned and managed by a hosting company 108 that keeps the data available and accessible, and the physical environment protected and running. The cloud storage 134 may be implemented as a hosted object storage service.

The backup system 102/112 includes a data mover that moves data from data source(s) 120 to target storage, which may be on-premise storage (e.g., DDR), or network storage. In an embodiment, the data mover is configured to move data from the data source to object storage 134 through the server 108. Unstructured data is often stored in cloud storage in a cloud object storage format or simply object storage format. Object storage architecture stores and manages data as objects compared to block storage, which handles data as blocks, and logical volumes and file storage which store data in hierarchical files, and is appropriate for cloud applications because it is elastic, flexible and it can more easily scale into multiple petabytes to support virtually unlimited data growth. Object storage is not particularly suitable for storage applications with high transactional rates, as it is generally not consistent enough for real-time systems such as transactional databases. For long-term or archival storage of large amounts of data, however, it offers significant advantages over block and file-based storage.

The object storage format includes a globally unique identifier for each object along with customizable metadata that is separated to enable other capabilities such as application and user-specific data for indexing. An object identifier is an address tied to the object, which enables the object to be found over a distributed system. Objects may be spread across multiple data centers and data can be found without the user knowing the specific physical location of the data. Object storage, along with the metadata, can be accessed directly via application program interfaces (APIs), HTTP and HTTPS. That differs from block storage volumes, which only can be accessed when they are attached to an operating system. In object storage systems, the data is bundled with the metadata tags and the unique identifier. These objects are stored in a flat address space, making it relatively easy to locate and retrieve the data. This flat address space storage thus helps eliminate the complexity and scalability challenges of hierarchical file system architectures.

The direct to object store system 100 is designed to be efficient in a public cloud deployment, yet also be able to operate using local (on-premise) object storage and compute resources.

Figure 2:
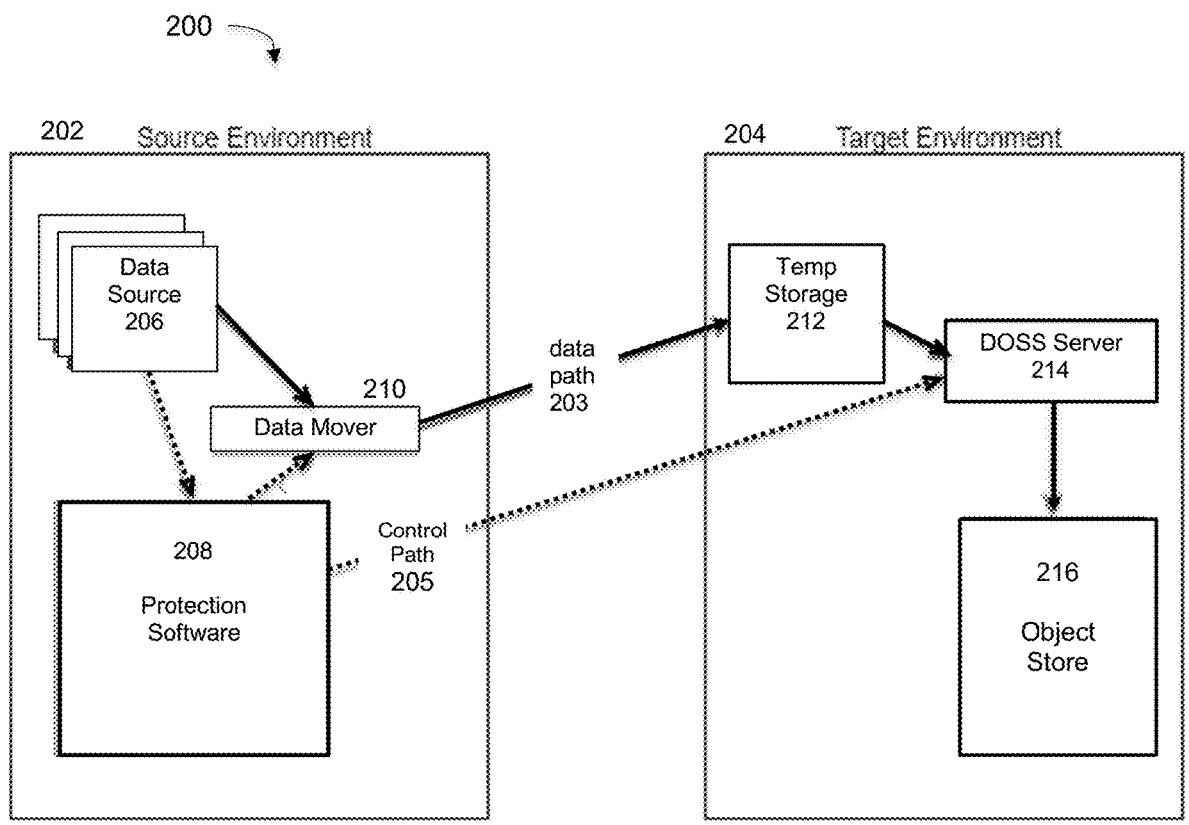
FIG. 2 illustrates a direct to object storage system with certain control flows, under some embodiments.

FIG. 2 illustrates a direct to object storage system with certain control flows, under some embodiments. For the embodiment of FIG. 2, the direct to object store system 200 uses a client/server architecture comprising source environment 202 and a target (storage) environment 204. The source environment (representing the client in system 200) contains one or more data sources 206 that have data backed up using protection software 208. A data mover component 210 sends the data along data path 203 to storage devices in the target environment 204 (representing the server in system 200) in response to control signals transmitted along path 205 from the protection software 208.

During a backup operation the data mover transmits the data to temporary cloud storage 212. Simultaneously, the protection software 208 sends control commands to the DOSS server 214. Using these commands, the DOSS server will process and move the source backup data into the correct form and place this data in persistent object storage 216. Upon completion the temporary data 212 can be deleted. In an embodiment, this server performs or coordinates certain tasks as follows: (1) manages each data source as a separate namespace, (2) breaks up each data source into a series of fixed size sequential blocks, (3) uses a specialized change record type (reverse delta objects), and (4) leverages a simple catalog to reduce data duplication. Based on these attributes, the system provides a resource efficient method for protecting a data source and eliminates or reduces complex and resource intensive garbage collection operations. In addition to efficient backups and recovery workflows, it also favors efficient recovery of the most recent version of a data source over older versions.

In addition to transmitting full blocks for full backups, system 200 is configured to detect sub-block changes, such as through change block tracking (e.g., VMware CBT) in order to format and send the smallest amount of data possible to DOSS system 204. The system may be configured with optional temp storage 212 (a landing zone). The data sent by the various data movers 210 will land either in temporary storage 212 or in the persistent storage 216. The DOSS server 214 will process the packets as necessary, store the post-processed data in object storage 216 and remove any unneeded data.

One aspect of the DOSS system 200 is that all data for each data source 206 will reside in a single non-shared namespace. With respect to the namespace rationale, there is typically very little commonality of data across data sources as data sources are placed into operation. When an application is initially deployed, there may be a high chance it will have a substantial amount of data in common with other data sources through infrastructure code such as operating systems and application binaries. However, as applications are used over time, the amount of data specific to each application instance will dwarf the size of this common data. This system architecture takes advantage of the fact that data deduplication uses a substantial amount of compute resources to find data commonality. The DOSS system eliminates garbage collection in exchange for consuming the extra storage necessary for data source isolation, as compute resources are very expensive in the public cloud, while storage costs are relatively inexpensive.

As is known, when protecting data sources, one of the key attributes to evaluate is data commonality. If multiple data sources have much data in common, then using a shared namespace where multiple data sources can refer to this common data can result in a significant storage cost savings, which is essentially how deduplicated storage systems operate. For storage of data in the public cloud or in a user-owned infrastructure, the cost all of the required resources (storage, compute and REST operations) needs to be minimized. Both the backup and data expiration/deletion phases are major consumers of (expensive) compute resources in shared namespace systems. During the backup process, the data is analyzed to determine how data should be divided into atomic segments and how these segments are persisted in target storage. Determining these segments is computationally expensive. In addition, due to data deletion and data commonality, garbage collection (GC) processes must run periodically so that unreferenced data can be removed to free up storage. As reference counting segments is very difficult and can limit system availability due to data locking, garbage collection usually requires looking at a portion of the data space on each run. Whatever method is employed, the cost to compute data commonality during backup and data deletion is expensive. Besides the costs for storage and compute in any deployment (public cloud or on-premise), there are other costs in the public cloud such as the cost of REST transactions which can become a significant factor.

Figure 3:
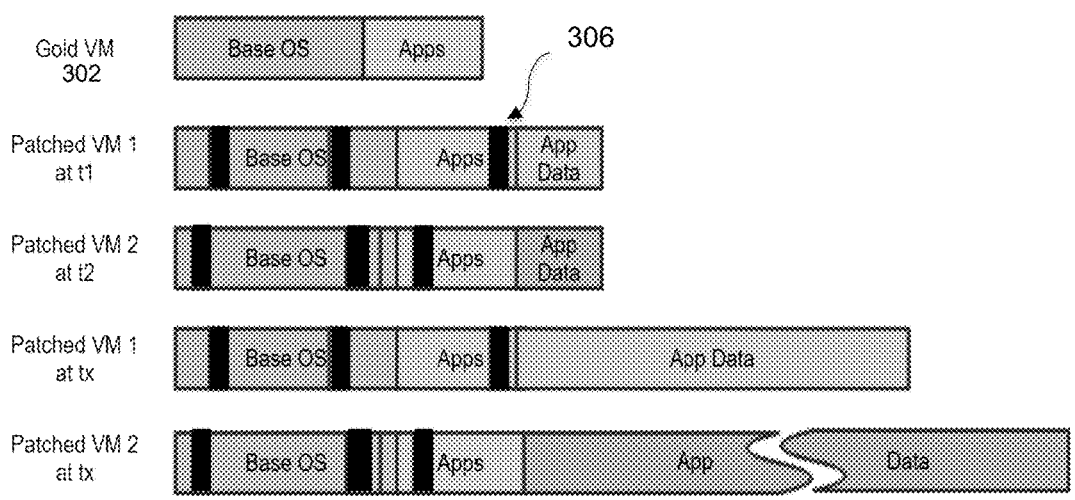
FIG. 3 illustrates an example of changing data commonality among different virtual machines over time.

To illustrate this issue, consider the following case of two Microsoft SQL server data sources running on a VM. A VM typically consists of a base OS, one or more application, and associated application data spread across one or more VMDKs. FIG. 3 illustrates an example of changing data commonality among different virtual machines for this explanation. Initially, the bulk of a VM's disk usage consists of the base OS and application executables, as shown in FIG. 3 as the "Gold Image" VM 302. For this example, this may be a Gold Image of a MS SQL server that includes a specific version of MS Windows which is deployed two times, i.e., in VM1 and VM2. When this image is first deployed, (at time t0) a set of patches to the OS and SQL server are applied for security and functionality. In FIG. 3, the black segmented areas 306 represent patches (or other updates or modifications) applied to the base OS and applications. At a later time, t1, the same Gold Image is deployed and new/different patches are deployed to support an additional customer capability. At this point in time, it can be seen that the two "identical" VMs (VM1 and VM2) have already diverged.

Over time (time tx) each of the VMs have been adding data independently from each other. In many cases, the application data will be unique between the VMs and this data size will dwarf the base system of just the OS plus application binaries. Also, even given identical roots, the VM OS and application upgrades and patches are often applied unevenly, which further contribute to differences between the VMs. Thus, in most typical use cases, the amount of commonality across multiple data sources is low.

Figure 4:
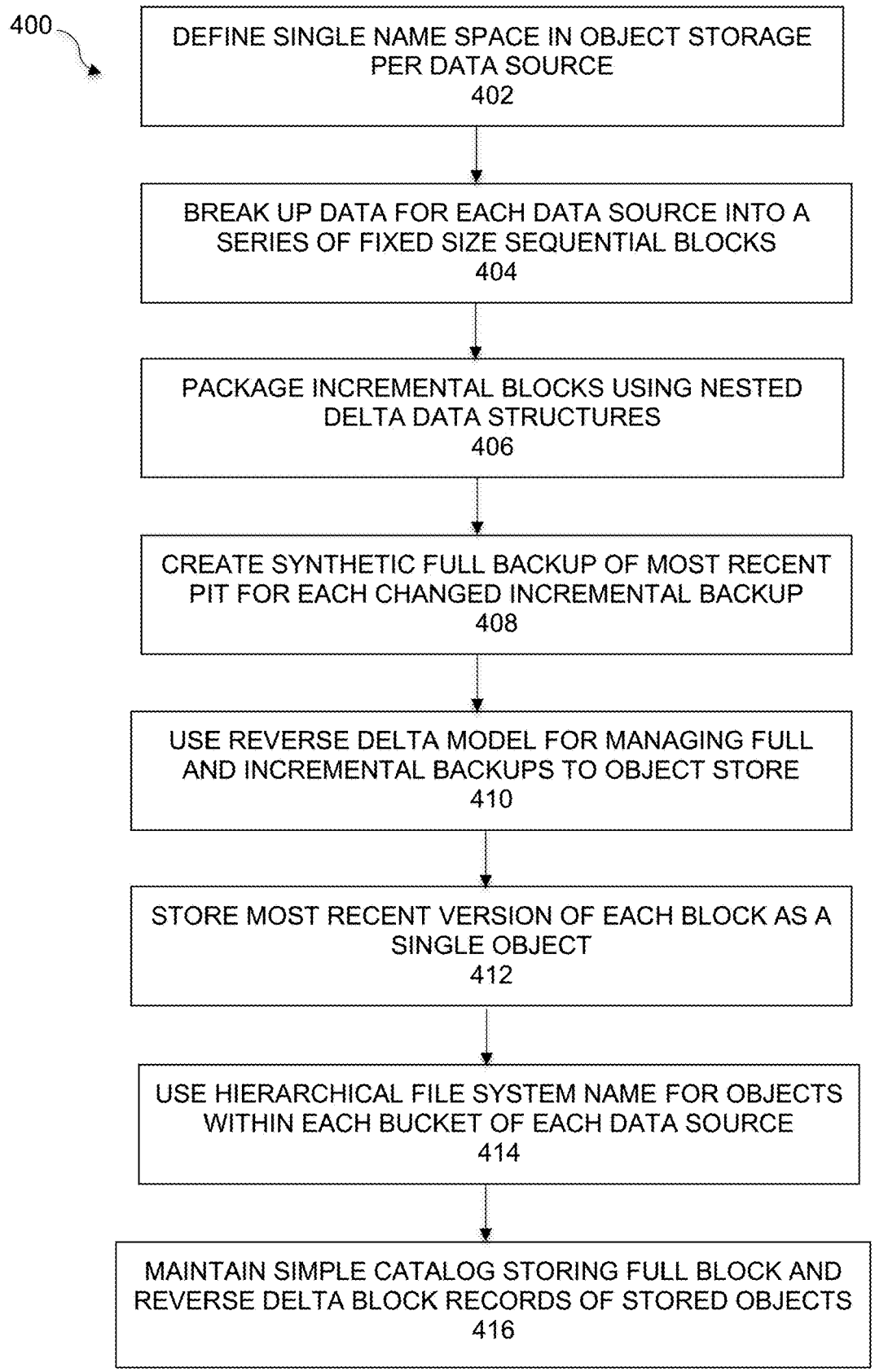
FIG. 4 is a flowchart illustrating an overall process of implementing a direct to object store system, under some embodiments.

FIG. 4 is a flowchart illustrating an overall process of implementing a direct to object store system, under some embodiments. Process 400 begins with defining a single, non-shared name space in object storage for each data source, as described above. This leverages the data divergence common for most deployed systems, as illustrated in FIG. 3 by utilizing relatively less expensive storage resources instead of compute resources in the cloud. For each data source, the data is then organized by the client into a series of fixed size sequential blocks for transmission and storage in object store 212 or 216, step 404. For this process, the data mover 210 will break up and transmit data respecting block boundaries and the DOSS server 214 will likewise organize and write blocks as a separate object in object store 216. The data source 206 is thus viewed as fixed sequential blocks.

Figure 5:
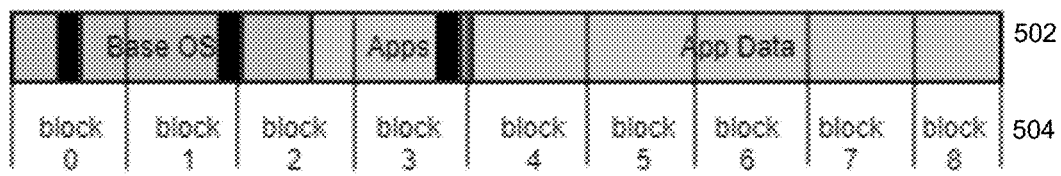
FIG. 5 illustrates the organization of source data into a series of fixed-size sequential blocks, under an example embodiment.

FIG. 5 illustrates the organization of data source 500 into a series of fixed-size sequential blocks, under an example embodiment. As shown in FIG. 5, the data comprises the OS, application binary and user content data in any appropriate organization, 502. The base OS data, application program code, and application data may be sequenced in any order and comprise data segments of any size, which change over time, as illustrated in FIG. 3. In an embodiment, this data 502 is organized into uniform sequential blocks 504. All blocks are of the same size, such as 4 MB or 1 GB each, or any other appropriate size. Each block may span one or more different types of data. Thus, as shown in the example of FIG. 5, some blocks contain OS and application binary code (e.g., block 2), while others may contain only application data (e.g., blocks 5, 6, 7, 8).

FIG. 5 illustrates a data source that may be a VM containing OS, application code, and data, as shown. It should be noted, however, that the data source may be any source of data, such as a large database file or file system, and so on. In this case, the source data may comprise only App Data and no Base OS or Apps code. Likewise, other data sources may contain comprise different compositions of data types depending on their configuration. Regardless of data type or composition, the data 502 is organized into the uniform blocks 504.

Figure 6:
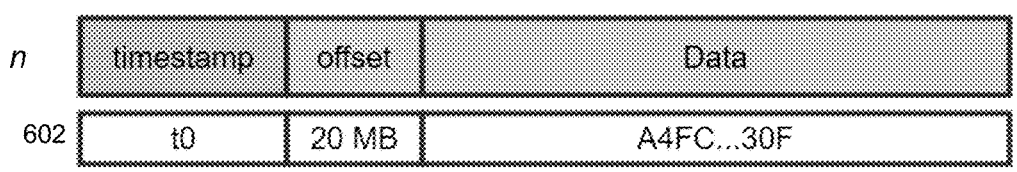
FIG. 6 illustrates a data transmission format for uniform sequential blocks, under some embodiments.

This sequential block data structure 504 is used for transmitting data between the client data mover 210 and the object store 212 or 216. During a full backup, the data full data source will be broken up into a series of blocks as shown, and these full blocks will then be packaged and sent to the server using the format shown in FIG. 6. Each block (Block n) is formatted to contain a timestamp, an offset value, and the block data. FIG. 6 illustrates example values 602 for each of these data elements. For the example of FIG. 6, if the original data source is broken up into 4 MB blocks, the data 602 would represent block number 5 and the data portion would contain 4 MB of pre-compressed data. The block number can be derived by the offset from block 0, which for an offset of 20 MB for 4 MB blocks yields block number 5. During incremental backups, intelligent clients will know which blocks have changed, the offset of the change per block and the size of the changed data. This will allow the data to be packaged in an efficient manner that will eliminate unnecessary bandwidth usage.

Figure 7:
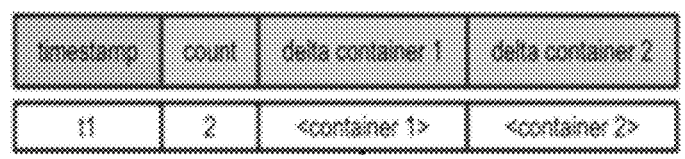
FIG. 7 illustrates the packaging of incremental blocks using nested delta data structures, under an example embodiment.
Figure 7:
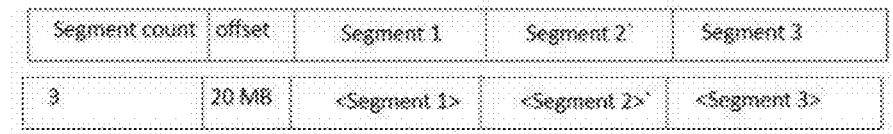
Figure 7:
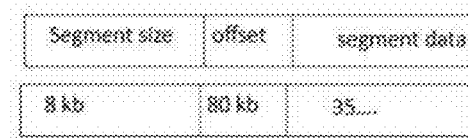

With reference back to FIG. 4, once the client source data has been broken up into, the blocks are then packaged into nested delta data structures, step 406. FIG. 7 illustrates the packaging of incremental blocks using nested delta data structures, under an example embodiment. The nested delta data comprises data for segments 706 within delta containers 704 for deltas 702 at specific timestamps. A delta is sent as a stream of data consisting of each of the data elements of diagram 700 for any number of containers 704 within the delta 702 and segments 706 within the delta container 704. For purposes of illustration, FIG. 7 shows the composition of this data stream as three separate data structures, though they are actually packaged sequentially in a single stream.

The illustrated data structures of FIG. 7 include a delta data structure 702 containing the timestamp, number of changed blocks ('count'), and entries for delta containers 704 having changed blocks (e.g., container 1 and container 2). Each changed block is represented in delta container data structure 704, which contains the number of changed segments within that block (segment count'), the offset of the block, and each segment that is changed for that block (e.g., segment 1, segment 2, segment 3). Each changed segment is represented by data structure 706 that contains, for each changed segment within a block, the segment size, the segment offset into the block, and the segment data. As previously stated, the data of FIG. 7 is packaged together, such that the entire delta 702 is sent as a stream. For the example of FIG. 7, this stream consists of the following: timestamp+count+segment count (for delta container 1)+offset for segment 1 followed by 8K, 80K and the data 35EC. The data stream then continues with the segment size/offset/segment data for segment 2, then the segment size/offset/segment data for segment 3. Next is the segment count (for delta container 2)+offset for segment 1 of container 2 followed by the segment size/offset/segment data for this segment 1, and so on.

For further purposes of clarity, only a portion of the entire possible data stream for delta 702 is shown in diagram 700. This portion comprises the branch for block 1 of container 1 of the delta 702. It can be appreciated that an entire delta data stream can be formed for container 2 of delta 702 and blocks 2 and 3 for delta container 704, and so on, for any practical number of containers and segments within each container.

The example of FIG. 7 illustrates the processing of the block of container 1 starting at absolute offset 20 MB. At t0 the full block starting at offset 20 MB is sent in its entirety to the object store 212 or 216. At the first incremental backup time (t1), two blocks are changed as referenced by the number 2 in the 'count' data element at t1. There is one at offset 20 MB and a second block (not shown) indicated by <container 2>. The block at offset 20 MB has three segments that are modified, as indicated by the value '3' in the 'segment count' entry. The first modified segment in the 20 MB block has an 8 KB extent and starts at offset 80 KB from the start of the 20 MB block (for total offset of 20,080K from the start of the data source). The delta block record 706 also contains the modified data. The data portion of these structures (e.g., the 'block data' field) may be compressed prior to transmission and will be stored in a compressed format based on which cost is cheaper, i.e., the cost to store versus the compute cost for decompression. These packets can also be encrypted for transmission to ensure security and data integrity.

For the embodiments of FIGS. 6 and 7, the segment 706 offset is a relative offset, while the delta container 704 offset and the block 602 offset are absolute offsets. This enables the system 200 to decouple the data being sent by the client 202 from how it is processed by the DOSS server 214 and organized when persisted in object store 216. While a block size of 4 MB may initially be used, it may be later determined that a different block size is desirable. This will allow the DOSS server 214 to organize or re-organize its data block size in the future without impacting the client 202.

For less sophisticated clients, changed blocks may be sent in their entirety. This, however, will generally result in slower backups, higher bandwidth usage and higher storage costs due to the unchanged data sections being sent and stored unnecessarily. Intelligent clients that can detect sub-block changes may send delta blocks as described above or optionally send full blocks as needed, such as in the case where a substantial amount of data in a block has changed.

In an embodiment, the DOSS system 200 implements a logical data organization. that is designed to be cost-efficient and high performance for the most important use cases. As backups occur with the most frequency, they must execute efficiently and incur a low cost. While users may choose to store many point-in-time (PIT) copies of a data source, it is nearly always the case that one of the most recent versions of a data source is the most often recovered version and requires the lowest recovery time objective (RTO). When a disaster recovery event or data error occurs, a low RTO is critical to a business in order to get an application back online in the shortest possible time. Conversely, recovery of older versions is typically due to lower priority requests (e.g., analysis or test uses), and therefore a lower RTO is acceptable. In fact, it is generally the case that the single most recent copy of a data source is exclusively required in a disaster or error recovery scenario. The DOSS system 200 is thus configured to so that the most recent version of the stored data has the lowest RTO.

Although saving the full data source from every possible PIT backup provides equally quick recovery for any PIT, there is a significant storage cost that would be incurred by this simplistic technique. In order to be storage (cost) efficient, the DOSS system only saves a full copy of the most recent version of a data source and supplements this latest full copy with delta records that are used to synthesize previous PIT copies of the data (reverse delta objects).

As shown in FIG. 4, process 400 creates a 'synthetic full' backup of the most recent point in time for every incremental backup where a source data block has changed, step 408. It will create a reverse delta record that can be used to synthesize the prior PIT version of the data. In order to accomplish this, the DOSS server will take change records for the current PIT, and create a reverse delta record and a new synthetic full backup.

The DOSS process thus uses a reverse delta model for efficient management of full and incremental backups, step 410. This helps optimize cost and performance through data organization for the key workflows, and enables the lowest RTO to the most recent version of a data block while minimizing the required storage. The reverse delta model always stores the most recent version of each block as a single object, step 412. In addition, it also stores specialized reverse delta incremental objects. Each reverse delta object contains the data necessary to transform a complete block to a prior state or point in time. These deltas are applied successively (most recent to oldest) on a block to transform the most version of a block to any prior point in time that is retained.

Figure 8:
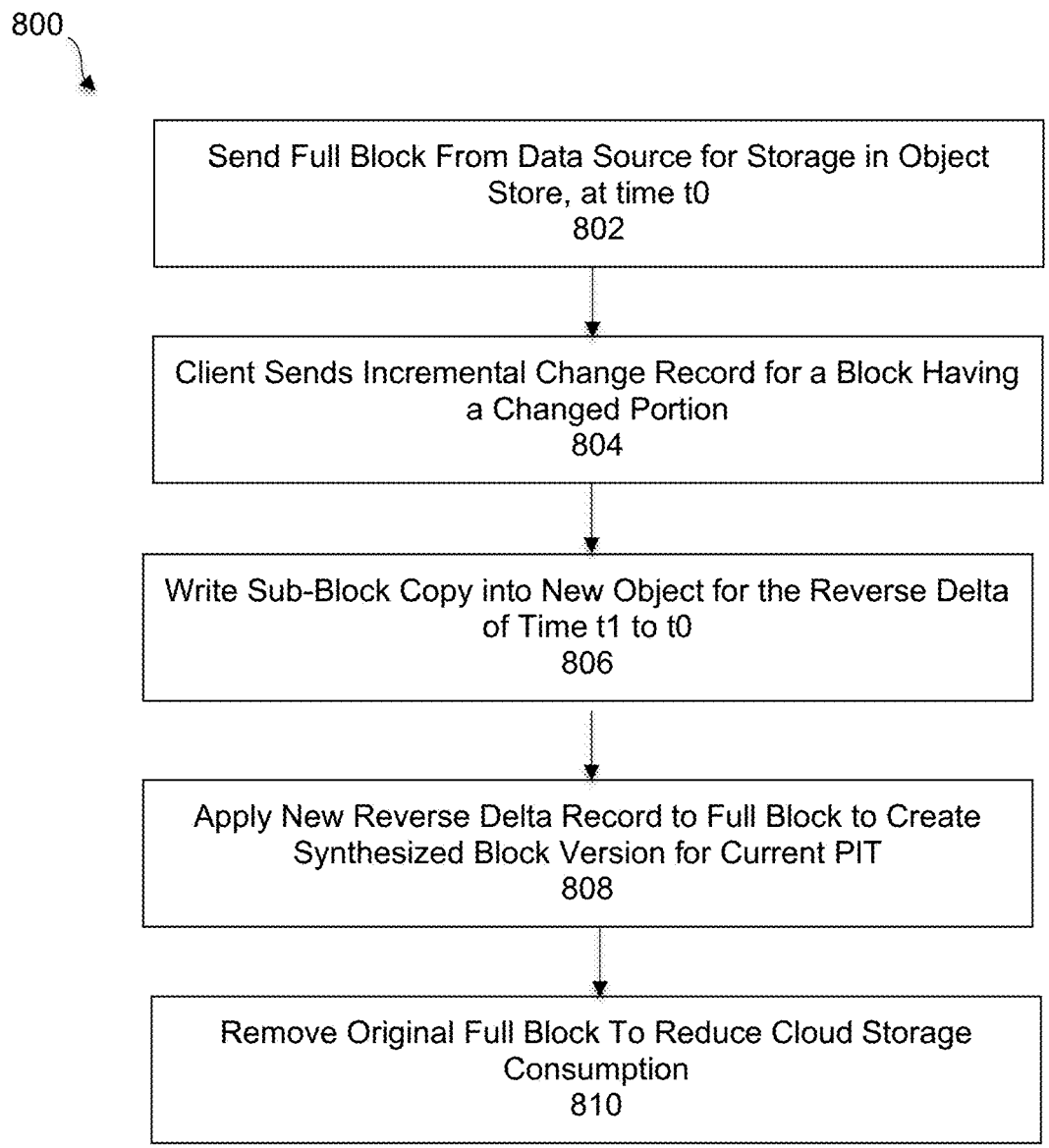
FIG. 8 is a flowchart illustrating a method of deriving a reverse delta object for creating a synthetic full backup, under some embodiments.
Figure 9A:
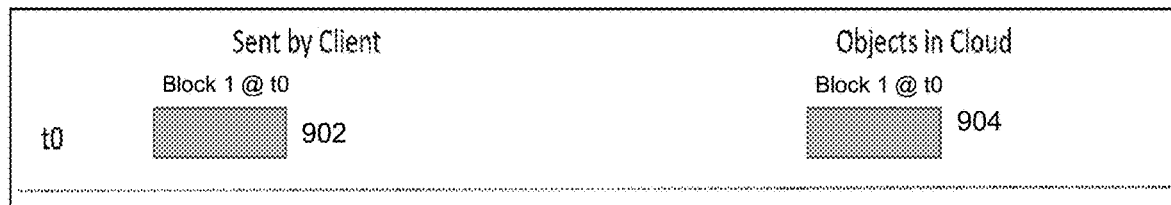
FIGS. 9A, 9B, 9C illustrate an example sequence of processing data blocks sent by a client to a cloud-based object store for deriving a reverse delta object, under some embodiments.

FIG. 8 is a flowchart 800 illustrating a method of deriving a reverse delta object for creating a synthetic full backup, under some embodiments. As shown in process 800 of FIG. 8, at an initial time (t0), a full block from the original data source 206 is sent by the client 202 for storage in the object store 212 or 216, step 802. This is illustrated in FIG. 9A as an example of a full block (Block 1 @ t0) 902 sent by the client at time t0 to be stored as an object 904 in cloud storage.

As shown in step 804 of FIG. 8, for incremental backups, the client sends an incremental change record for a block as it detected a change in a portion of the block in the data source between t0 and t1. For the figures and description, the time marker t0 represents a first PIT, and later times are denoted t1, t2, t3, and so on, to a present point in time, tx. Thus, the numeric value of a marker increases as time proceeds, and t0 is always the first PIT.

Figure 9B:
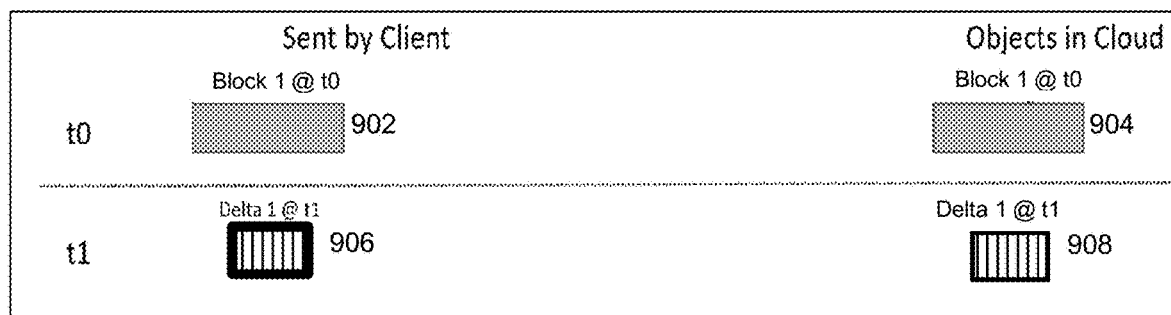
Figure 9C:
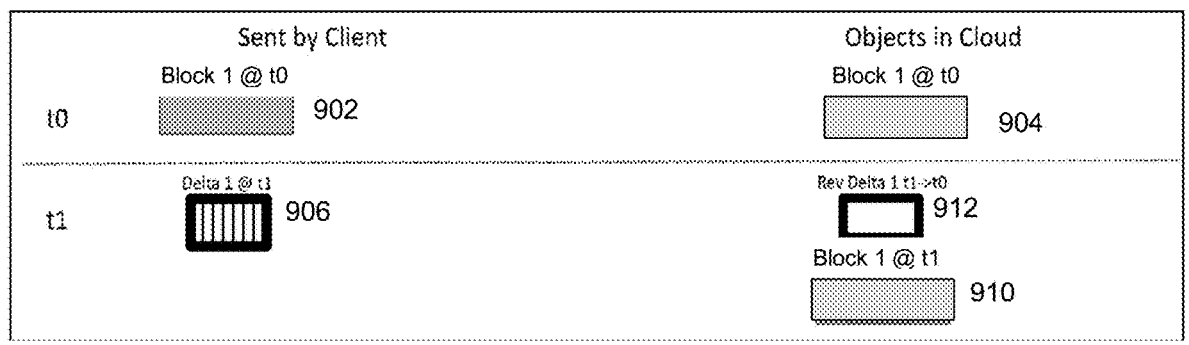

FIG. 9B shows at time t1, the client sends the delta data 906 for an incremental change to the cloud, where it lands there temporarily unchanged as the same delta object, denoted 908. FIG. 9C shows that the DOSS server extracts the area mapped by 908 from the object stored full block 904 and generates a reverse delta object 912. It then takes the stored delta object 908 and copies it to the same mapped area in full block 904 to generate the synthetic full backup at time t1 (Block 1@ t1), 910. Then full block 904 and delta 908 objects are then deleted from the cloud, leaving only the synthetic full backup object 910 and the reverse delta object 912 for time t1 in the object store in the cloud. The overall process of process 800, as exemplified in FIGS. 9A-9C now results in the cloud object store containing a synthesized full version 910 of the block at time t1, and the data necessary to step the state of block 1 backwards from t1 to t0, as encapsulated in the reverse delta object 912.

The process of FIG. 8 enables the quickest RTO for the most recent version of a block, as it is embodied in a single object (e.g., synthesized full block 1, 910). To obtain a previous version of an object, the reverse delta objects are applied starting with the most recent delta object. In the example of FIGS. 9A-9C, the reverse delta objects (t1 t0) 912 can be applied to the new full block (Block 1 @t1) 910 to synthesize the original version of the block at t0 (Block 1 @t0) 902/904. This illustrates a significant the advantage of the reverse delta model. It is highly storage efficient, enables the lowest RTO for the most recent copy of the data, and enables a simple data expiration and data tiering model, as the oldest reverse delta objects can simply be tiered or deleted.

Figure 10:
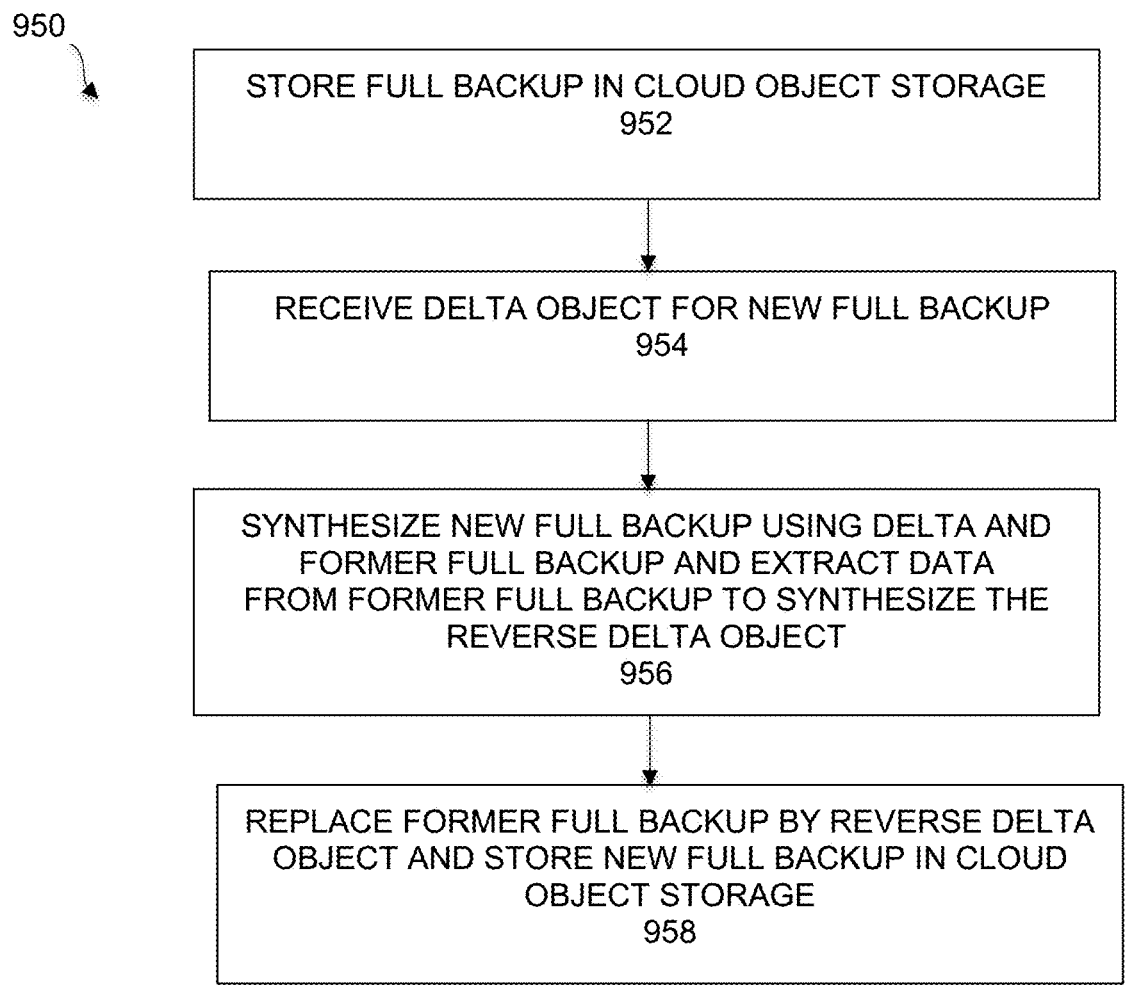
FIG. 10 is a flowchart that illustrates an overall process of generate a new full backup using a reverse delta object applied to a previous full backup, under some embodiments.

FIG. 10 is a flowchart that illustrates an overall process 950 of generate a new full backup using a reverse delta object applied to a previous full backup, under some embodiments. FIG. 10 summarizes method enabled by the delta and reverse delta objects of FIGS. 9A to 9C. The process of FIG. 10 begins with a last full backup (904) stored in the cloud object store, 952. During a data protection operation, the system DOSS server 214 will receive a delta object for a new full backup, 954, for any incremental changes to the backed up data that change blocks in the backup image. This new backup renders the full backup of 952 to be a 'former full backup.' The DOSS server 214 synthesizes a new full backup 910 using the delta object 908 and the former full backup 904 and extracts data from the former full backup 904 to synthesize the reverse delta object 912, step 956. The server then replaces the former full backup by the reverse delta object and stores the new full backup in cloud object storage, 958.

In order to manage the reverse delta objects, embodiments of the DOSS system use a block hash catalog is maintained to manage the lifetime of each object. This is shown as step 416 of overall process 400 of FIG. 4, and will be explained in further detail below.

Figures 11, 12:
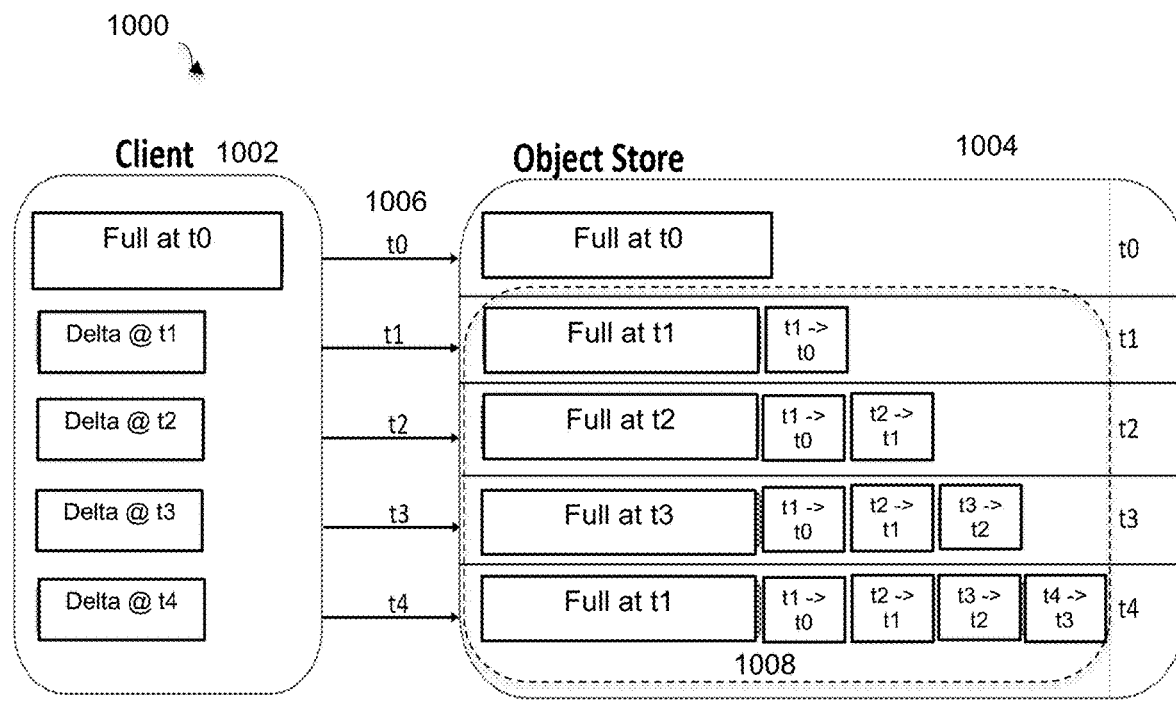
FIG. 11 illustrates an example reverse delta object data structure, under some embodiments.
FIG. 12 illustrates a layout and example entries for a block hash catalog for the direct to object storage system, under an example embodiment.

As discussed previously, a reverse delta object is computed and stored for every changed block for all retained point in time backups (PITs) in the form of reverse delta objects. FIG. 11 illustrates an example reverse delta object data structure implemented on the object store, under some embodiments. Data structures in diagram 1000 of FIG. 11 represent what data is sent by the client and the resulting contents of the object store for a single block that exist at various points in time. For diagram 1000, the time intervals 1006 go forward in time from t0 (initial) to t4 (present) through intervening PITs t1, t2, and t3, for example. The client 1002 contains a full backup at time t0 and a sends a delta for every point in time t1, t2, t3 up to the present time, t4, and these deltas in the client 1002 essentially represent forward deltas as used in many current systems. This information is then passed to the object store in the public (or private) cloud which then creates reverse delta objects to produce a data structure where the full backup is available for the present or most recent PIT so that it can be quickly restored instead of recreated (synthesized) using forward deltas, as in current systems. It should be noted that if a block is unchanged between two points in time, no delta record will be changed and therefore no reverse delta object will be computed or stored. This is illustrated in FIG. 12 where there is not an entry for every PIT.

The example of FIG. 11 illustrates transmission of backup and delta data from client 1002 to object store 1004 for each PIT of time intervals 1006, such as from t0 to t4 for a backup of a single block that was modified at each of times t1, t2, t3 and t4. As shown in FIG. 10, each PIT backup (t0, t1, t2 . . . ) has a full copy of the data for the most recent PIT. In addition, for blocks modified during any PIT, a reverse delta record (e.g. t1→t0) is created. These reverse delta objects are used when restoring to a previous PIT copy of a block that was modified. For example, if at t1, there is a request for PIT t0, the system will take the 'Full at t1' object, apply the reverse delta (t1→t0) to it in order to synthesize a version of the block that existed at t0. Likewise, if at t4 there is a request for PIT t1, the system will start with the 'Full at t4' object, and apply the reverse delta t4→t3 followed by applying the reverse delta t3→t2 and finally applying the reverse delta t2→t1. The result is that the data 'Full at t1' will be synthesized through this application of reverse delta objects starting from the most recent time first. As discussed previously, this will yield the lowest RTO for the most recent PIT copy. It should be noted that although FIG. 10 shows one reverse delta object for every point in time, there can be zero or more reverse delta objects per block. The actual number of reverse delta objects per block will be the same as the number segments 706 per block.

As a converse to the above, the RTO will increase as is described above for older versions which is acceptable as the RTO for these older copies typically is less critical. An important advantage of the reverse delta format is that deltas that refer to old copies are candidates for moving to a less expensive tier of object storage which can further be used to reduce cost.

Expiring a prior PIT is as simple as deleting a reverse delta object. For example, if at t4, PIT t0 is to be expired, DOSS simply removes the reverse delta t1→t0. Note that the processing required for reverse delta objects is nearly identical to the processing required when expiring a standard incremental (forward delta). Given this fact that the processing will be incurred any event, the reverse delta approach consumes almost no additional net resources while optimizing for RTO of the latest version.

For the embodiment of FIG. 11, the data elements shown in region 1008 of object store 1004 are computed by cloud or object storage processes, and the full data is stored at every current point in time (t0 to t4). The full data set at any PIT was not sent from the client to the object store, but was instead created synthetically in the object store or in the public cloud for the object store.

As can be seen in FIG. 11, a full (synthetic full) backup is stored in the object store 1004 for each PIT, in contrast to the client, which only stores a single full copy of the data for any PIT. This synthetic full backup is created by applying the reverse delta object data to the full backup at the next recent PIT. Using the object storage data structure of system 1000, to restore the present or most recent backup data from the object store 1004, (at t4), simply involves sending the full at tx from the object store to the client 1002, and then apply forward deltas to obtain a present full backup, as required in present systems. System 1000 instead always maintains the full backup at each PIT, including the present PIT, by synthesizing (on the object store) the full backup from the regularly provided reverse delta objects. The client does not hold any backup datasets, it generates delta objects, transmits them to the cloud and then deletes the delta objects.

With respect to the contents of the object store 1004, an object store bucket will exist for a set of data sources. Within each bucket, multiple data sources will use object storage names that resemble a hierarchical file system. This is shown as step 414 of FIG. 4. Each object will start with a UUID that uniquely identifies a single data source. Following this UUID, there will be a block number. After the block number will either be the word "full" or a number that represents the timestamp for each incremental. An example of data entries for the object store bucket can be given as follows:

A472 . . . 3D7/2/Full=Most recent version of block #2 for data source A472 . . . .

A472 . . . 3D7/2/<t9>=Reverse Delta for block #2 that was valid up to time <t9>.

A472 . . . 3D7/2/<t6>=Reverse Delta for block #2 that was valid up to time <t6>.

In an embodiment, the object store elements are given names that can be readily catalogued. For this embodiment, a simple block hash catalog of these objects is maintained in order to ensure that data which exists on the client is not needlessly retrieved from the DOSS server during a restore operation, as shown in step 416 of FIG. 4. The block hash catalog is stored on the DOSS server and contains the full block record and all reverse delta block records for each stored object. This allows the client to specify specific PITs for which data is to be retrieved or restored, where the client computes and sends hashes for all blocks at a particular PIT. For each block and timestamp, the server has appropriate hash values helping it determine which data to reconstruct and provide to the client. This mechanism essentially compares what is local to the client and what is on the server to minimize what is transmitted between the two. The block hash catalog thus helps define which blocks the server must compute (optionally) and send. If the server determines that the client already has the correct version of a block, no data will be computed by the server and no data will be transferred from the server to the client.

Each unique object includes a hash of the entire block. FIG. 12 illustrates a block hash catalog with some example records, under an example embodiment. This catalog lists the hash of each block for every point in time that it is changed. The block hash catalog comprises a table 1110 listing hash values, timestamps, and block numbers for each block of the object. The timestamp (tEnd) of Table 1110 represents the last time that the data in the reverse delta object was valid and the Hash entry represents the hash of the entire block at that time.

Using an example for block 2, to perform a restore of latest version, simply retrieve object A472 . . . 3D7/2/Full. To perform a restore from timestamp <tx>, find all incremental backups for block 2 where tEnd>=<tx> sorted by tEnd in descending order and apply them against the full version of the object in descending order. To get block 2 at t10, no deltas are applied to the full. To get block 2 at t8, the reverse delta object where tEnd=t9 is applied to the full. To get block 2 at t4, the reverse delta object where tEnd=t9 is applied against the full followed by applying the delta object where tEnd=t6, and so on.

During a backup operation, either the client may send the hash for each block or the server may compute the hash. For this embodiment, the delta container 704 can include entries for the block hash or hashes. During a restore operation, the hash value is checked to determine if the data needs to be sent.

As described, embodiments of the DOSS system 200 employ a reverse delta method that optimizes system performance for the most common restore workflow, that is, recovery of the most recent version of a data source. This method maintains resource efficiency by only storing the changed data, and by mapping stored data for restore processes that more closely match how users actually want data to be restored with respect to recovery time objectives. The system leverages a catalog to record the start time and end time of each version of data per block. It also decouples the client from the server, which enables many server enhancements to occur without requiring changes to clients. The system represents a great improvement over existing technologies that do not employ various efficiencies or optimize for restoring of the most recent version of a data source, such as those that simply identify identical runs of data between data sources and use fingerprints to avoid storing duplicate data.

Although embodiments may be described with respect to the data backup operations and applications, it should be noted that other network-based applications that process and store data objects may also be used. Such applications can include content creation and applications as well as data movement applications.

Public Provider Cost Model Optimization

As stated above, the cloud network 110 may be implemented as a public cloud network provided by a public cloud provider. At present, popular cloud providers include Amazon, which provides the Amazon Simple Storage Service ("AWS S3") for object storage accessible through a web service interface, Google Cloud, or Microsoft Azure, among other similar services.

Access and use of the public cloud through such providers is typically provided under a subscription basis where the user pays for service based on specific pricing plans covering storage, retrieval requests, data transfers, management/analytics, replication, and other activities. For example, the providers have different prices for storing objects in storage buckets, such as based on object size, storage duration, and storage class. They also charge for requests made against the storage buckets and objects based on request type and quantity for specified operations, such as PUT, COPY, POST, LIST, GET, SELECT, and other similar retrieval or transaction requests.

As shown in FIG. 10, a major step in storing new full backups in object storage using the reverse delta model involves synthesizing a new full backup by creating the reverse delta object for a previous (former) full backup, as shown in step 956. In a public cloud, this operation can be very expensive for various change patterns using current cloud provider pricing models, and using regular GET and PUT operations for entire blocks.

Embodiments include methods to optimize the cost for the synthesis process 956 in public cloud (e.g., AWS, Google, or Azure) environments, regardless of any specific pattern of changes. For this embodiment, a backup repository (including full backups) is stored in AWS S3 storage (or similar cloud storage) as a set of objects, as described above. It is assumed that compute facilities performing the steps of FIG. 10 are running in the same region with backup data, to eliminate any outgoing transfer costs from the public cloud (AWS) region. If such compute facilities are remote, then any transfer costs would need to be added. It is also assumed that the compute facility has sufficient memory and CPU resources to evaluate certain algorithms, such that for example, if an algorithm requires reading S3 objects of size 1 GB, the target environment 204 has compute resources with at least 1 GB memory.

In certain cases, embodiments may be described with respect to implementation in an Amazon AWS S3, Microsoft Azure, or Google storage systems for ease of illustration, however embodiments are not so limited, and can be applied to any other or similar commercial or third party-based cloud and web service platform providing object storage.

The cost for the synthesis process 956 for most public cloud providers may be divided into two major parts: (1) the object storage API costs, and (2) evaluation compute costs. Therefore, the overall cost of both of these parts depends on the specific cloud provider prices, region, other parameters, and, in some cases, on any specific agreement between the provider and a specific customer. Embodiments will be described with respect to general prices constants which can be pre-configured for any specific implementation.

While different cloud providers, and indeed even the same cloud provider often provide different prices for their services and resources over time and depending on region, certain key elements of the cost model for these providers are used to establish the cost optimization process. For purposes of description, the term "cost model" refers to the common activities that are charged by a provider, such as Get, Put and Transfer operations; the term "price" means the current amount that is charged for these activities by appropriate units of use. In general, prices may change quite frequently, but the cost model has and is anticipated to remain the same for most providers over a long period of time.

In an embodiment for an example use-case, the following cost components are considered:

(1) Reading data from object storage is charged according to number of read (GET) operations. The process will denote price for one GET operation as GET_PRICE.

(2) Writing data to object storage is charged according to number of write (PUT) operations. The process will denote price for one PUT operation as PUT_PRICE.

During the synthesis process 956, the DOSS system must perform the following tasks: (a) GET operations to read from the DOSS temporary storage/landing zone 212; (b) GET operations to read from the former full backup; (c) PUT operations to write data to the new full backup; and (d) PUT operations to write data to the reverse delta object.

It should be noted that for actual typical backup workloads (e.g., 1-5% daily change rate) cost of operations a and d are negligible compared to operations b and c.

The compute cost in the cloud depends on the type of compute facility chosen (e.g., EC2 instances of various types, containers, etc.) and the running time of a specific facility. The price of one second running time of the specific facility chosen for DOSS implementation will be denoted COMPUTE_1S_PRICE.

For the synthesis process 956, the running time for pure calculations is relatively negligible and most of the running time is spent on reading/writing data from and to S3 object storage, and this time depends on two parameters: the amount of data read and written from/to S3, and the network bandwidth for specific facility. This allows the definition of a price parameter depending on specific compute type chosen for DOSS as:

COMPUTE_1MB_PRICE=(1 MB/<Network bandwidth>)*COMPUTE_1S_PRICE

As described above, a full backup image is divided into blocks of constant size, such as shown in FIG. 5. The amount of data that the synthesis step 956 must read and write from a full snapshot backup will be bigger in case of large block size, where the nominal block size is on the order of 4 MB. If this block size is large, then the synthesis process will read more "unchanged" data. So, the compute cost will be larger with large block sizes of the full backup. On the other hand, if the block size is small, the number of GET and PUT API calls will increase. So, in this case, the cost of the APIs will be larger with smaller block sizes of the full backup.

An additional (and possibly more serious problem) is that the optimal block size for cost optimization depends not only on the balance between API and compute costs, but also the change pattern of new backup incrementals for the new delta objects. For example, consider a 100 GB full image and a 1 GB delta object that can be distributed in two different ways: (1) 256 extents of 4 MB each of the extents is fully overridden, or (2) 8K changes of total 1 GB size uniformly distributed over entire 1 TB disk (128K extents of 8 KB each). In first case, the optimal block size will be close to 4 MB blocks, because compute cost will be fully optimized (the process evaluates only data that was changed), and the API cost will be sufficiently low. In the second case there is a very high probability that a change will reside in every specific block almost regardless of block size. Thus, the amount of data that synthesis process must read and write will be very close to 1 TB. In this example, optimal block size will be the one with the minimum API requests, meaning a block size of 1 TB, or whatever size value is allowable under any compute memory restrictions. Any true optimization must thus effectively predict future changes of distribution over the storage disk, and any such prediction is practically impossible for backup operations involving random data changes.

The actual variable of the synthesis operation that is optimized is typically the block size, such as from 4 MB to another size, but it depends on the cloud service provider. For example, for AWS, the variable is block size only, whereas for Microsoft Azure it could be block and page size. Other variables may be used for other cloud providers.

Figure 13:
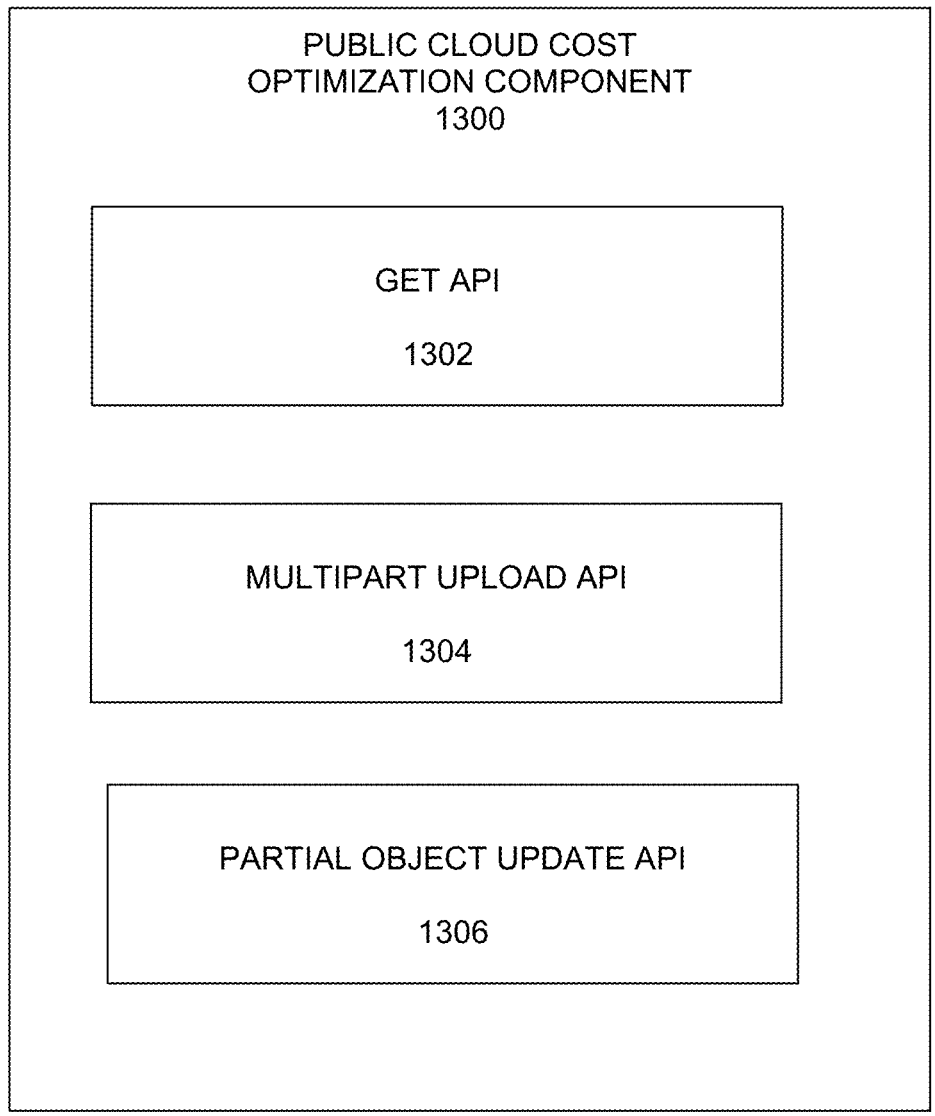
FIG. 13 illustrates API processes for the cost optimization component, under some embodiments.

Embodiments overcome the above-mentioned shortcoming by using the delta objects and a cost selection method that chooses the lesser of two calculated cost estimations. Such a process may be provided in a cost optimization process 118 or component in or executed by DOSS server 108. Such a process includes certain APIs to interface with the overall DOSS network system 100. FIG. 13 illustrates API processes for the cost optimization component, under some embodiments. As shown in FIG. 13, the cost optimization process or component 1300 includes a GET API 1302. This API has a range parameter, which if set, allows the user to read only specific range a (offset, length) from a specified S3 object. The amount of data downloaded to caller (compute that performs the request) is a length specified by the range parameter. The object size generally does not affect the running time. In most instances, a GET request with the range parameter is charged the same as regular GET request (such as supported by AWS/Google/Azure).

The second API is a multipart upload API 1304, which allows a user to upload an object in parts. This API imposes certain requirements and restrictions, such as: every part (except the last one in an object) must be at least 5 MB; parts can be uploaded sequentially or concurrently from same or different locations; each part can be uploaded or copied from within the range of another S3 object; and if a part is copied from another S3 object it is not downloaded to the caller, which means that the amount of written data depends only on uploaded parts. For this API, each part is charged as a separate PUT request. In current implementations, this API may be supported by AWS, but not by Azure.

The third API is a partial object update API 1306, which is currently supported by Azure. Cloud providers that support API 1304 will be referred to as "cloud providers that support copy_part" and those that support API 1306 will be referred to as "cloud providers that support partial update."

For the cost optimization process itself, it is first assumed that a sufficiently large block size of the full backup image (e.g., 1 GB or larger) is set. It is also assumed that the delta-blocks in the DOSS temporary storage or landing zone 212 are ordered in increasing offset order.

Figure 14A:
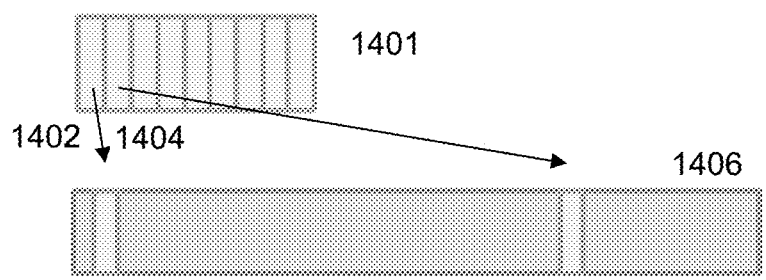
FIGS. 14A-D illustrate an example implementation of a cost optimization process, under an embodiment.

FIGS. 14A-D illustrate an example implementation of a cost optimization process, under an embodiment. FIG. 14A illustrates two sequential delta blocks that override some offsets inside a full backup block. In Azure, and similar systems, an object is divided into the pages and every page may be replaced, so certain pages in object can be updated, and others will stay untouched.

Figure 14B:
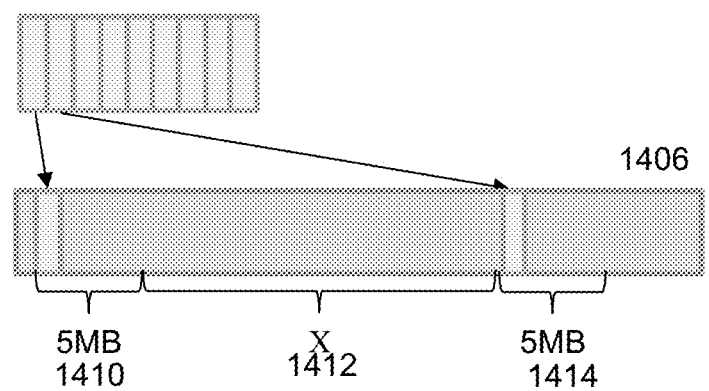

As shown in FIG. 14A delta blocks 1402 and 1404 within a set of delta blocks 1401, have a minimal block size of 1 MB, for example. These two blocks are then extended to a minimal part size (e.g., 5 MB) and extended over a much larger object 1406, such as over a 1 GB object. FIG. 14B shows the delta blocks 1402 and 1404 each extended to an example part size of 5 MB and distributed over object 1406 with an unchanged area of size X between these two delta blocks, which are forward delta objects 906/908.

Figure 14C:
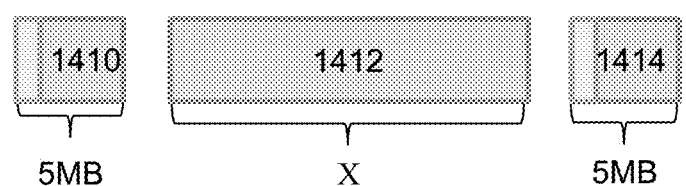

This produces three individual parts denoted 1410, 1412, and 1414, which can be evaluated in two different ways. The first method is to evaluate these three parts as separate parts of a multipart download. This method is illustrated in FIG. 14C, where parts 1410, 1412, and 1414 are separated and individually cost evaluated. In this case, there are two distinct processes depending on whether API 1304 or 1306 is used. For cloud providers that support copy_part (API 1304), the synthesis process will be required to perform two GET requests (with Range parameter) for 5 MB parts, and then merge and upload them as part of multipart request. The unchanged part in the middle ('X') will be copied from previous last full backup chunk. For cloud providers support that partial update (API 1306), the synthesis process will be required to perform two GET requests (with Range parameter) for 5 MB parts, and then merge and upload each one as a different part update. The value of 'X' for the region is determined from the nature of the forward delta objects.

Figure 14D:
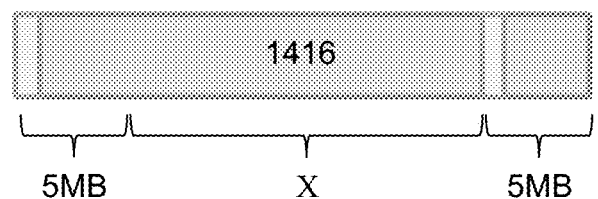

The second method of evaluating parts 1410, 1412, and 1414 is to evaluate the three parts as one big part of a multipart upload. This method is illustrated in FIG. 14D, where the parts 1410, 1412, and 1414 are combined to form part 1416 for cost evaluation as a whole. In this case, the synthesis process will be required to perform one GET request for the entire combined area of 1410 1412 and 1414 (e.g., 5 MB+5 MB+X or 10 MB+X) area, and then merge and upload the data.

For this example embodiment, the cost computation for the individual evaluation of FIG. 14C will be calculated for cloud providers that support copy_part as (for the extended size of the deltas as 10 MB):

$$2*GET\_PRICE + 3*PUT\_PRICE + 10*COMPUTE\_1\_MB\_PRICE$$

The cost computation for the individual evaluation of FIG. 14C will be calculated for cloud providers that support partial update as (for the extended size of the deltas as 10 MB)

$$2*GET\_PRICE + 2*PUT\_PRICE + 10*COMPUTE\_1\_MB\_PRICE$$

The cost computation for the combined evaluation of FIG. 14D will be calculated as (for the extended size of the deltas as 10 MB):

$$GET\_PRICE + PUT\_PRICE + (10+X) *COMPUTE\_1\_MB\_PRICE$$

As can be seen from the factors in each of the equations above, some computations create more API costs and less compute costs, while others create more compute costs and less API costs.

Figure 15:
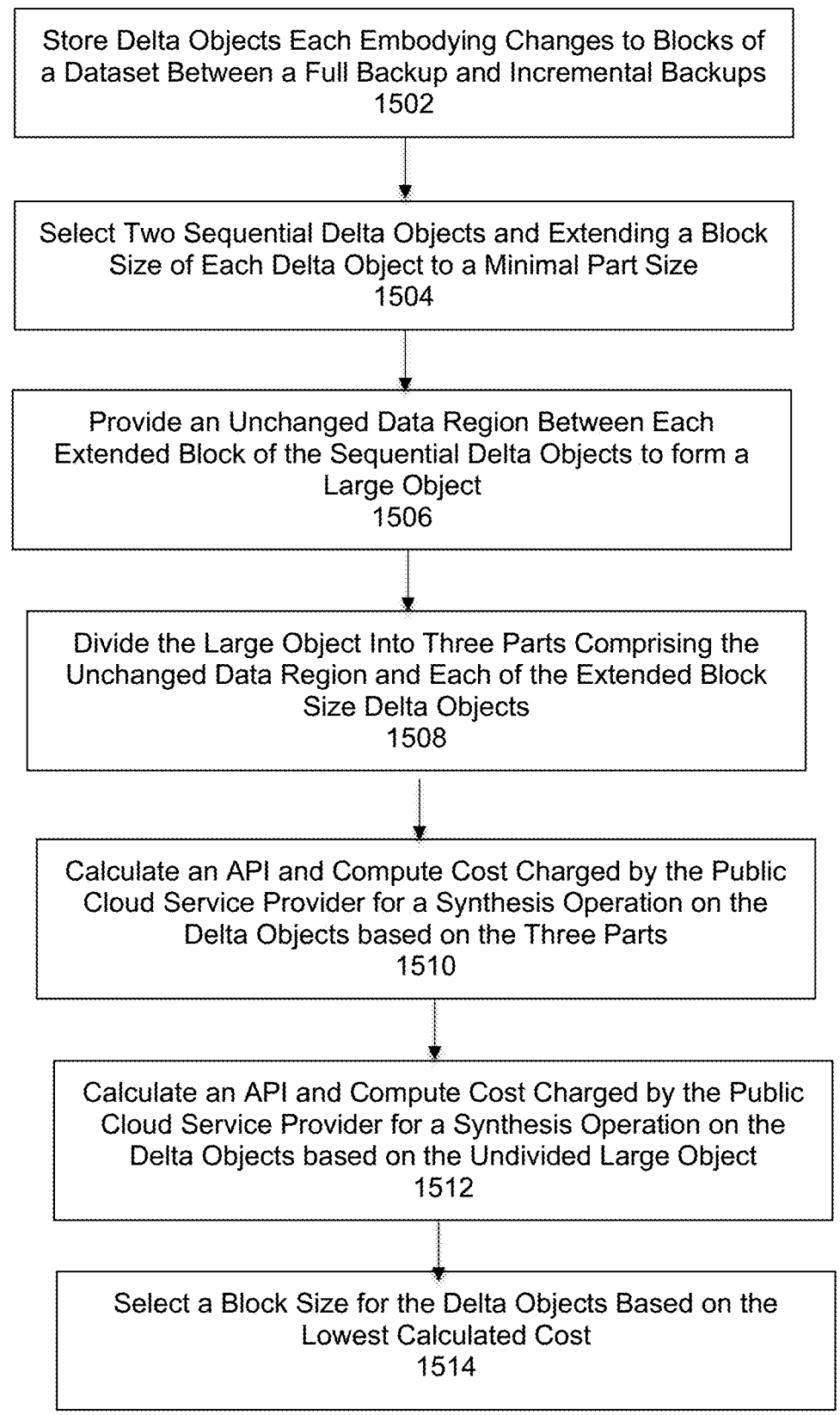
FIG. 15 is a flowchart that illustrates a process of evaluating and optimizing API operation and compute costs of synthesizing full block images in public cloud object storage, under some embodiments.

FIG. 15 is a flowchart illustrating a method of determining a block size as cost optimized for a public cloud provider, under some embodiments. Process 1500 starts with the stored delta objects each embodying changes to blocks of the backup data between a full backup and one or more incremental backups. The block size of the delta objects are each of a same block size, but this block size is variable based on the cost computations, 1502.

Two sequential delta objects are selected 1504 to form a substantially larger object by extending each block to a minimal part size that is larger than the block size and inserting a region of unchanged data between the two delta objects, 1506. This is illustrated as the process of FIG. 14B. The larger object 1406 is then divided into three different parts comprising the inserted region, and each of the extended delta object blocks, 1508. This is illustrated in the process of FIG. 14C. The process calculates an API and a compute cost for synthesizing the delta objects as per step 956 of FIG. 9 based on a cost model and current price schedule of the public cloud network provider for the three different parts, 1510. The API and compute costs for the synthesis process is also calculated for the undivided larger object 1406 as a whole, 1512. The calculated costs are compared and the block size for the delta objects used in the synthesis operation 956 is selected based on the lowest cost calculation, 1514.

For the cost calculation in the case of the three different parts, an additional or alternate calculation may be performed for cloud providers that support copy_part versus cloud providers that support partial update.

Figure 16:
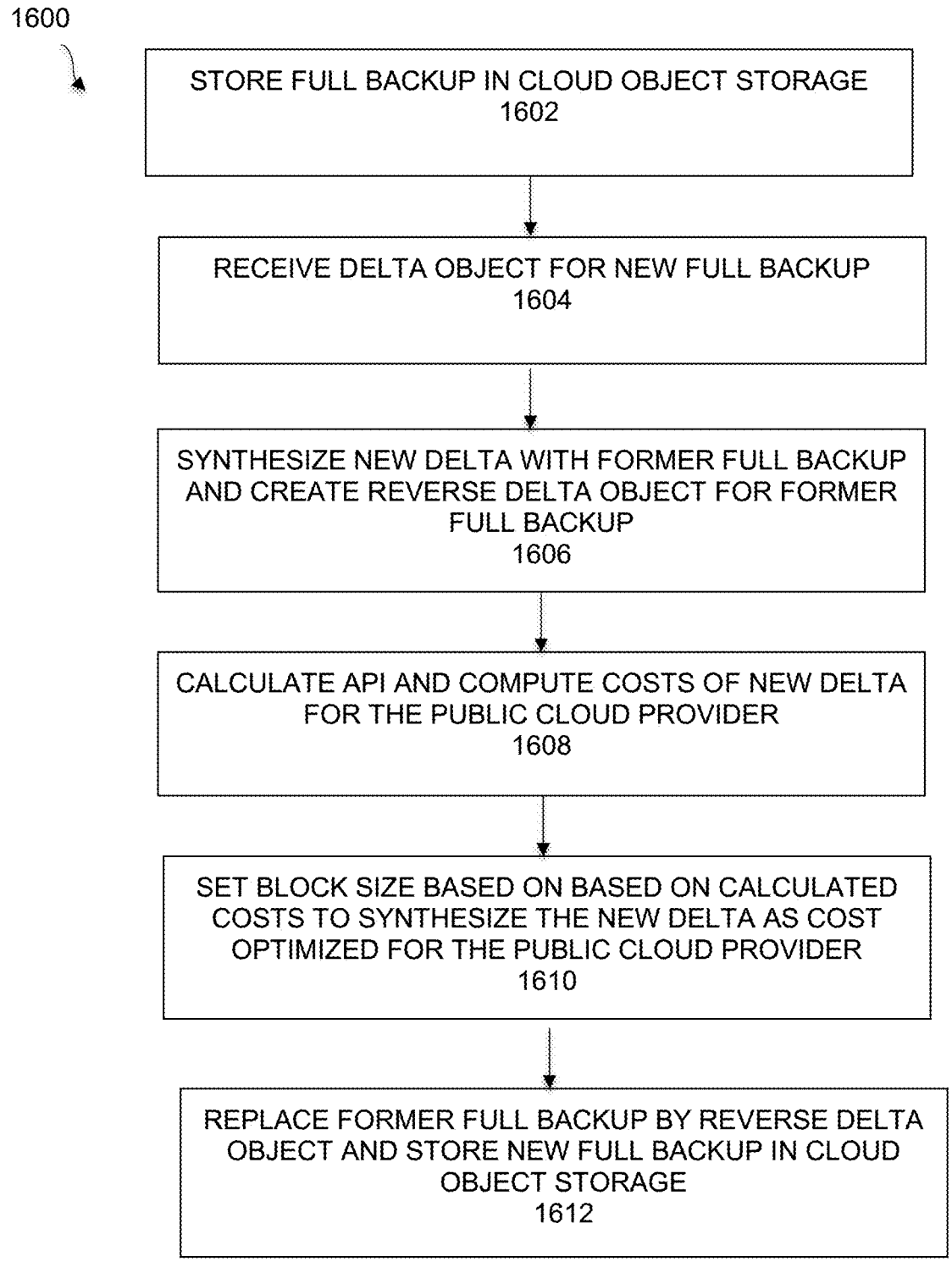
FIG. 16 is a flowchart that illustrates calculating cost optimizations as part of a direct object storage system in a public cloud, under some embodiments.

This cost evaluation process can be executed as part of the overall DOSS process during the synthesis step 356. FIG. 16 is a flowchart that illustrates a process of calculating cost optimizations as part of a DOSS process, under some embodiments. Process 1600 of FIG. 16 essentially adds some additional processing steps to process 950 of FIG. 10. Process 1600 begins with a last full backup (904) stored in the cloud object store, 1602. During a data protection operation, the system DOSS server 214 will receive a delta object for a new full backup, 1604, for any incremental changes to the backed up data that change blocks in the backup image. This new backup renders the full backup of 952 to be a 'former full backup.' The DOSS server 214 synthesizes a new delta with the former full backup image and creates a reverse delta object 912 for the former full backup, 1606. During this synthesis operation, the process calculates the API and compute costs of the new delta object based on the equations provided above, 1608. The lowest cost option is then selected to determine the optimal block size by cost optimization for the selected cloud provider, 1610. The server then replaces the former full backup by the reverse delta object and stores the new full backup in cloud object storage, 1612.

When the DOSS system evaluates the synthesis process evaluates delta, it can calculate the costs above (according to specific cloud provider, region, and other parameters) and choose least expensive process. This evaluation process can be extended to all blocks in backup delta and then synthesis process will select the most cost-optimal way to evaluate the specific backup delta objects. The cost optimization process allows users to not only evaluate costs of specific backup delta objects, but to compare different parameters for a single cloud provider or even compare costs charged by different cloud providers for the same operations.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 17:
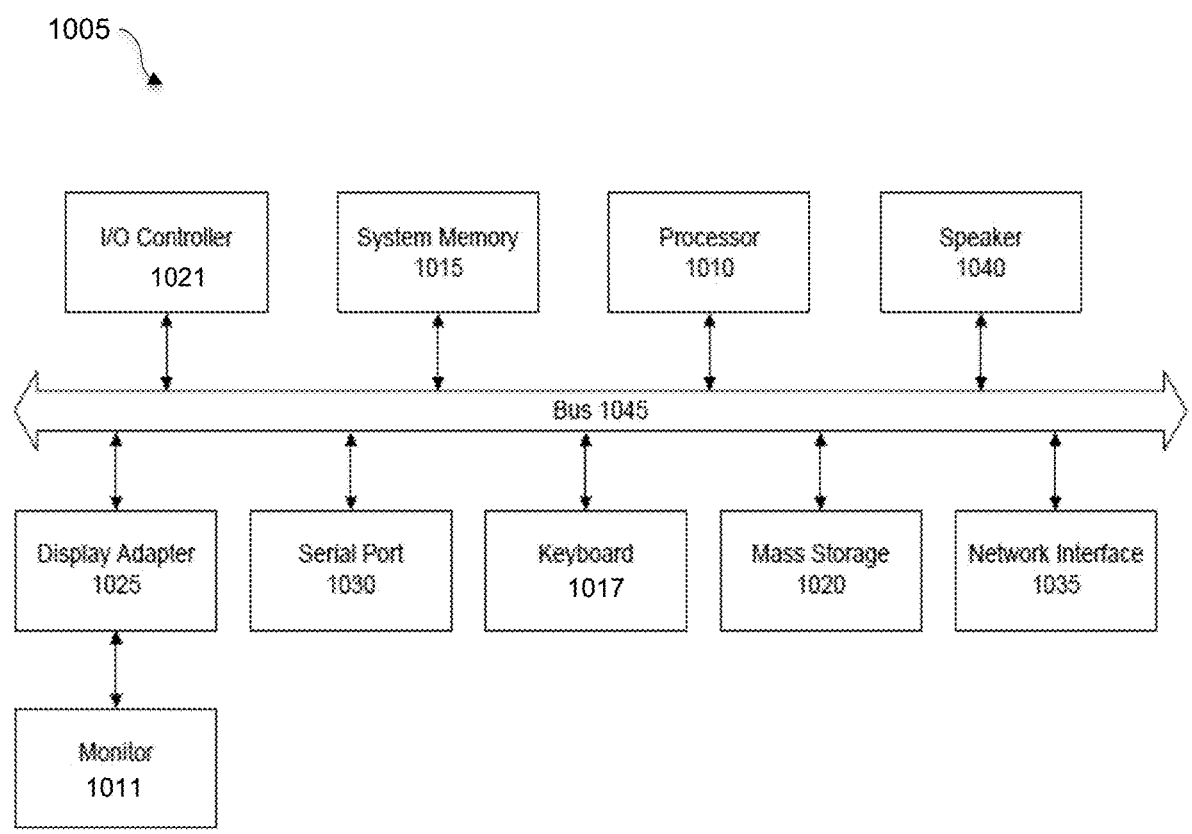
FIG. 17 is a system block diagram of a computer system used to execute one or more software components of a direct to object store process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 17 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing a cost of storing backup data in an object store of a public cloud network provided by a cloud provider, comprising:
    storing delta objects each embodying changes to blocks of the backup data between a full backup and one or more incremental backups, wherein the delta objects are each of a same block size, wherein the block size is variable;
    selecting two sequential delta objects to form a substantially larger object by extending each block to a minimal part size that is larger than the block size and inserting a region of unchanged data between the two delta objects;
    dividing the larger object into three different parts comprising the inserted region, and each of the extended delta object blocks;
    first calculating costs for a synthesis operation on the delta objects based on a cost model and current price schedule of the cloud provider for the three different parts;
    second calculating costs for the synthesis operation based on the cost model and current price schedule of the cloud provider for the substantially larger object as a whole; and
    selecting a block size for the delta objects based on a lowest cost calculated between the first calculating and second calculating steps.

2. The method of claim 1 wherein the first and second calculated costs each comprise API and a compute cost for the synthesis operation.

3. The method of claim 2 wherein the API costs comprise a GET API portion, a multipart upload portion, and a partial object upload portion.

4. The method of claim 1 wherein the two sequential data objects have successive absolute offset values within the backup data.

5. The method of claim 3 wherein the first calculating is performed for a cloud provider that supports copy_part operations.

6. The method of claim 3 wherein the first calculating is performed for a cloud provider that supports partial updates.

7. The method of claim 1 wherein the synthesis operation comprises part of a direct to object store write operation and further wherein the delta objects are applied to a former full backup image to generate respective reverse delta objects.

8. The method of claim 7 wherein the first and second calculated costs comprise costs of GET and PUT API calls.

9. The method of claim 8 wherein the synthesis operation performs:
    GET operations to read from temporary object storage in the object store provided by the cloud provider;
    GET operations to read data from the former full backup image;
    PUT operations to write data to a new full backup image; and
    PUT operations to write data to a reverse delta object.

10. The method of claim 7 wherein the compute cost is costs are based on a price to run a compute facility provided by the cloud service provider for a period of one second.

11. The method of claim 10 wherein the compute further comprises an amount of time spent reading and writing 1 MB of data based on the one second period price.

12. A computer-implemented method of optimizing a cost of storing backup data in an object store of a public cloud network provided by a cloud provider, comprising:
    storing a full backup image in cloud object storage comprising a former full backup and one or more incremental backups with delta objects for each incremental backup, wherein the delta objects are each of a same block size, wherein the block size is variable;
    creating a reverse delta object from each block based on respective delta objects applied to the former full backup to synthesize a new full image;
    calculating application program interface (API) and compute costs for the new full image based on a cost model and current price schedule of the cloud provider, wherein the compute costs are based on a price to run a compute facility provided by the cloud service provider for a period of one second;
    setting the block size to a value minimizing the API and compute costs for the cloud provider; and
    selecting two sequential delta objects to form a substantially larger object by extending each block to a minimal part size that is larger than the block size and inserting a region of unchanged data between the two delta objects;
    dividing the larger object into three different parts comprising the inserted region, and each of the extended delta object blocks;
    first calculating costs for a synthesis operation on the delta objects based for the three different parts;
    second calculating costs for the synthesis operation based on the cost model and current price schedule of the public cloud network provider for the substantially larger object as a whole; and
    selecting a block size for the delta objects based on a lowest cost calculated between the first calculating and second calculating steps.

13. The method of claim 12 wherein the compute further comprises an amount of time spent reading and writing 1 MB of data based on the one second period price.

14. The method of claim 12 wherein the API costs comprise costs of GET and PUT API calls.

15. The method of claim 12 wherein at least one of the first and second calculating is performed for one of a cloud provider that supports copy_part operations, or a cloud provider that supports partial updates.

16. The method of claim 12 wherein the synthesis operation performs:
GET operations to read from temporary object storage in the object store provided by the cloud provider;
GET operations to read data from the former full backup image;
PUT operations to write data to a new full backup image; and
PUT operations to write data to a reverse delta object.

17. A system for optimizing a cost of storing backup data in an object store of a public cloud network provided by a cloud provider, comprising:
a processor;
a backup component storing a full backup image in cloud object storage comprising a former full backup and one or more incremental backups with delta objects for each incremental backup, wherein the delta objects are each of a same block size, wherein the block size is variable;
a direct to object store component creating a reverse delta object from each block based on respective delta objects applied to the former full backup to synthesize a new full image; and
a cost optimizer component calculating application program interface (API) and compute costs for the new full image based on a cost model and current price schedule of the cloud provider, wherein the compute costs are based on a price to run a compute facility provided by the cloud service provider for a period of one second, and setting the block size to a value minimizing the API and compute costs for the cloud provider, the cost optimizer component further:
selecting two sequential delta objects to form a substantially larger object by extending each block to a minimal part size that is larger than the block size and inserting a region of unchanged data between the two delta objects,
dividing the larger object into three different parts comprising the inserted region, and each of the extended delta object blocks,
first calculating costs for a synthesis operation on the delta objects based for the three different parts, and second calculating costs for the synthesis operation based on the cost model and current price schedule of the public cloud network provider for the substantially larger object as a whole, and
selecting a block size for the delta objects based on a lowest cost calculated between the first calculating and second calculating steps.

18. The system of claim 17 wherein a compute cost of the compute costs is based on a price to run a compute facility provided by the cloud service provider for a period of one second, and an amount of time spent reading and writing 1 MB of data based on the one second period price, and wherein the API costs comprise costs of GET and PUT API calls.

* * * * *